Patented Apr. 28, 1931

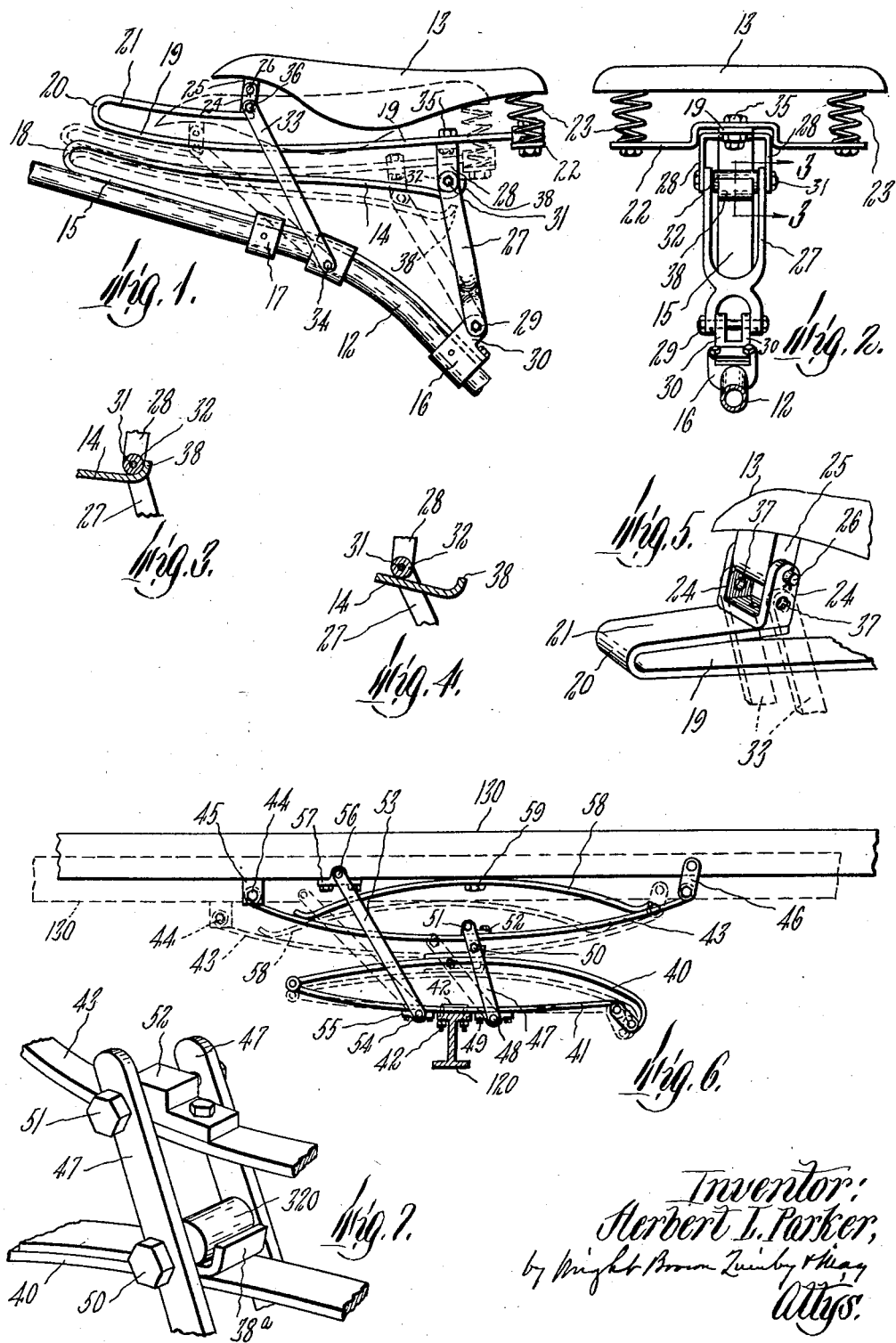

1,803,130

UNITED STATES PATENT OFFICE

HERBERT L. PARKER, OF BRAINTREE, MASSACHUSETTS

SHOCK-ABSORBING LOAD SUPPORT

Application filed June 28, 1930. Serial No. 464,492.

This invention relates to a road vehicle including a base member supported by the vehicle wheels, and a load-carrying member yieldingly supported by springs and vertically movable relative to the base member. The invention may be variously embodied, for example, in a motor cycle, the base member being an element of the cycle frame, and the load-carrying member being the saddle, or in an automobile, the base member being an axle, and the load-carrying member being an element of the chassis frame.

The object of the invention is to provide a shock-absorbing load support adapted to be interposed between the base member and the load-carrying member and permit desirably ample yielding upward and downward movements of the carrying member and its load under all road conditions and permit a temporary forward longitudinal displacement of said member and load by their momentum when movement of the base member is opposed by a road obstruction, such displacement enabling a rider to pass over a road obstruction without an uncomfortable shock or jar.

Of the accompanying drawings forming a part of this specification.

Figure 1 is a side view, showing portions of a motor cycle, and a load support embodying the invention interposed between a frame portion and the saddle of the cycle.

Figure 2 is a rear view of the same.

Figure 3 is a fragmentary section on line 3—3 of Figure 2.

Figure 4 is a view similar to Figure 3, showing a different condition.

Figure 5 is a fragmentary perspective view, showing a connection between the upper spring hereinafter described and the load-carrying member.

Figure 6 is a side view partly in section, showing portions of an automobile and a load support embodying the invention interposed between an axle and an element of the chassis.

Figure 7 is a fragmentary perspective view, showing details of the structure shown by Figure 6.

The same reference characters indicate the same parts in all of the figures.

In Figures 1 and 2, 12 designates a portion of the frame of a motor cycle, hereinafter referred to as a wheel-supported base member. 13 designates a saddle hereinafter referred to as a load-carrying member.

My improved shock-absorbing load support is adapted to be interposed between the members 12 and 13, and includes the elements next described.

14 designates a vertically acting base spring which is preferably a portion of a flat sided elongated strip of resilient metal including a portion 15, having an elongated bearing on the base member 12, and secured thereto by means such as clips or bands 16 and 17, and a neck portion 18, the base spring being located so that it extends lengthwise of the vehicle of which the base member 12 is an element. The rear portion of the base spring 14 constitutes a resilient track for a purpose presently stated. An upper spring, preferably formed from a flat sided resilient metal strip, is supported above and spaced from the base spring 14, and includes a lower portion 19, a neck portion 20, and an upper portion 21.

I provide means for securing the upper spring to spaced apart portions of the load-carrying member to cause the spring to extend longitudinally of the vehicle and approximately parallel with the base spring 14, said securing means including, in this instance, a cross-bar 22, fixed to the rear end of the spring portion 19, auxiliary springs 23, fixed to the cross-bar 22 and to the rear end portion of the load-carrying member 13, ears 24 (Figure 5) fixed to the rear end portion of the spring portion 21, and an ear 25 fixed to the forward end portion of the load-carrying member and connected by a bolt 26 with the ears 24.

I have shown the said connecting means more or less conventionally and do not limit myself thereto. It is to be understood that the upper spring may be connected with the load-carrying member at spaced apart points by any other suitable means.

An oscillatable rear strut, which in this instance includes a lower section 27 and an upper section 28, connects the base member 12 with the portion 19 of the upper spring. The lower section 27 is pivotally connected at its lower end with the base member 12, preferably by a bolt 29 engaged with ears 30 on the clip 16. The upper section 28 is fixed by a bolt 35 to the upper spring portion 19. The sections 27 and 28 are pivotally connected by a bolt 31 on which is rotatively mounted a roll 32 constituting a runner movable on the track portion of the base spring 14.

An oscillatable forward strut, preferably composed of two spaced apart parallel members 33, as indicated by dotted lines in Figure 5, is pivotally connected at its lower end with the base member 12, preferably by a bolt 34 (Figure 1), and is pivotally connected at its upper end with the upper spring portion 21 by a bolt 36 inserted in orifices 37 (Figure 5) in the ears 24 which connect the spring portion 21 with the load-carrying member 13. The struts and the upper spring are normally maintained in the positions relative to the base member, the base spring and the load-carrying member shown by full lines in Figure 1, by upward pressure of the track portion of the base spring 14 on the runner 32, the base spring 14 being provided with an upwardly projecting stop portion 38, against which the runner roll 32 abuts, as shown by Figure 3.

When the vehicle is running on a smooth road, the load support and load-carrying member remain in the condition shown by full lines, the springs acting conjointly to permit desirably easy up and down movements of the load-carrying member. When movement of the vehicle is opposed or checked by a road obstruction, the load-carrying member and the upper spring are momentarily displaced forwardly, as indicated by dotted lines in Figure 1, so that the shock or jar caused by said obstruction is sufficiently absorbed to prevent discomfort to a rider. When the obstruction is passed, the parts are caused as above described, to reassume their normal relationship.

When the invention is embodied in another type of vehicle, such as an automobile, the construction and arrangement may be as shown by Figures 6 and 7.

In this embodiment, the base member, designated by 120, is an axle of the vehicle, and the load-carrying member, designated by 130, is a longitudinal element of the chassis frame.

The base spring 40 is preferably a member of an elliptic spring, and the means for securing it to the base member 120 preferably include another elliptic spring member 41, connected with the ends of the base spring by well known means, as shown by Figure 6, and a clip 42 clamping the midlength portion of the member 41 to the base member 120. The member 41 is therefore rigid at its midlength portion and resilient elsewhere, so that it yieldingly supports the base spring 40. The upper spring 43 is preferably semi-elliptic and is secured at one end to the load-carrying member 130 by a bolt 44, engaging ears 45 on said member, and at the opposite end by links 46, pivoted to the upper spring and to the member 130.

The rear strut is preferably composed of two spaced apart members 47 (Figure 7), connected at their lower ends by a pivot bolt 48 with ears 49 on the member 41, said ears being close to the clip 42, and therefore on a relatively rigid portion of the member 41. The runner, here designated by 320, is mounted on a bolt 50 engaged with the members 47, and bears on the base spring 40. The strut members 47 are extended above the runner 320 and connected with the upper spring 43 by a bolt 51, extending through said members, and through a block 52, fixed to the upper spring. The base spring 40 is provided with a stop 38a, functioning like the stop 38 above described.

The forward strut is preferably composed, like the rear strut, of two spaced apart members 53, connected at their lower ends by a pivot bolt 54 with ears 55, on the member 41, said ears being on a relatively rigid portion of the member 41. The upper ends of the strut members 53 are connected by a pivot bolt 56, engaged with a socket member 57 on the load-carrying member 130.

The upper spring 43 is preferably reinforced by a resilient member 58, attached at its midlength portion to the load-carrying member 130 by a bolt 59, and bearing at its ends on the upper spring, as shown by Figure 6.

The last described embodiment of the invention functions like the embodiment first described, the load-carrying member 130 and the upper spring 43 being displaceable, as indicated by dotted lines in Figure 6, when movement of the vehicle is checked by a road obstruction. In each embodiment the rear strut is connected with the base member and with the upper spring, and carries a runner which is movable on a track portion of the base spring.

It is obvious that each or all of the spring elements of the load support may be composed of a plurality of leaves, if desired.

I claim:

1. A shock-absorbing load support adapted to be interposed between a wheel-supported base member and a load-carrying member of a road vehicle, said support comprising a base spring, means adapted to secure it to the base member in position to extend lengthwise of the vehicle, said spring including a track portion, a vertically acting upper spring, means adapted to secure the upper spring to spaced apart portions of the load-carrying member in position to extend lengthwise of the vehicle, an oscillatory rear strut adapted to be pivotally connected at its lower end with the base member, and engaged at its upper end with the upper spring, a runner connected with said strut and movable on the track portion of the base spring, and an oscillatory forward strut adapted to be pivotally connected at its lower end with the base member, means being provided for establishing a pivotal connection between the upper end of the forward strut and the load-carrying member, the arrangement being such that the load-carrying member is supported by the conjoint action of said springs, and is displaceable forwardly with the upper spring, by momentum, when forward movement of the base member is opposed by a road obstruction, the base spring cooperating with the runner and rear strut to normally establish an operative relationship between the base member, the springs, the struts, and the load-carrying member, means being provided for limiting the rearward oscillations of said struts.

2. A shock-absorbing load support as specified by claim 1, the base spring being semi-elliptic and reinforced by a semi-elliptic spring member adapted to be fixed at its midlength portion to the base member and having resilient end portions connected with the ends of the base spring.

3. A shock-absorbing load support as specified by claim 1, the said runner being an anti-friction roll rotatable on the rear strut and in rolling contact with the base spring.

In testimony whereof I have affixed my signature.

HERBERT L. PARKER.